UNITED STATES PATENT OFFICE.

CONRAD O. STINEBAUGH, OF SEATTLE, WASHINGTON, ASSIGNOR, BY DIRECT AND MESNE ASSIGNMENTS, TO GENERAL CHARCRETE COMPANY, OF SEATTLE, WASHINGTON, A CORPORATION OF WASHINGTON.

COMPOSITION OF MATTER.

1,020,325.     Specification of Letters Patent.     Patented Mar. 12, 1912.

No Drawing.     Application filed July 11, 1911. Serial No. 638,032.

*To all whom it may concern:*

Be it known that I, CONRAD O. STINEBAUGH, a citizen of the United States of America, and a resident of the city of Seattle, in the county of King and State of Washington, have invented certain new and useful Improvements in Composition of Matter, of which the following is a specification.

The object of my invention is to produce a composition or compound having a porous base combined with a binding agent applied as hereinafter described, by which a compound is produced, which will serve as a substitute for the common concrete compounds employed in reinforced concrete work and pavements; also as a substitute for building and paving blocks, brake shoes, and numerous other structures where it may be desired to combine lightness in weight with durability and toughness.

In carrying out my invention, I take a suitable cement and mix therewith in a dry state, charcoal, the latter being first reduced to a finely divided condition. To this is added blood and water, the whole being thoroughly mixed, and while plastic, placed in a mold and allowed to harden. I have found blood extremely efficient, the same apparently increasing the cohesive properties of the ingredients.

The formula of my compound is substantially as follows:—cement 8 parts by weight, charcoal 3 parts by weight, blood 1½ parts by weight, water 1 part by weight.

The blood may be used to supply the entire amount of water to set the cement; or a smaller amount of blood and more water may be used, if desired, provided there is water enough to hydrate the cement.

I have found in practice that the composition when molded, or set, is comparatively light in weight, is hard, tough, and durable, resisting in a material way wearing away or breaking as contradistinguished from cement compositions having sand or the like as a base.

The blood is specially beneficial in the manufacture of materials to be subjected to friction, such as brake shoes.

When the cement, charcoal and blood are mixed together, the water of the blood serum hydrates the cement so that the crystallization takes place in the usual manner, causing set and hardness. The blood solids are precipitated, as the water is withdrawn to hydrate the cement, in finely divided particles more or less uniformly distributed through the mass. These blood solids fill the voids that would otherwise exist in the product to a greater or less extent. These particles have the properties of a gel. On this account they aid materially in giving a binding property to a friction material.

The free lime in the cement seems to serve to preserve and harden the non-aqueous content of the blood.

The specific gravity of the finely divided charcoal is very low. For equal volumes, it weighs about one-fourth as much as cement. The resulting mixture, when set, is an extremely light product, having practically the specific gravity of water. A large percentage of charcoal not only causes the product to be light, but also renders it resilient, and capable of being worked like wood.

Having thus described my invention, what I claim and desire to secure by Letters Patent of the United States is:

1. A composition of matter, formed by mixing together cement, finely divided charcoal, and adding to said mixture blood, and allowing the same to set, substantially as described.

2. A composition of matter, consisting of substantially 8 parts by weight of cement, 3 parts by weight of charcoal to which is added before setting 2½ parts by weight of liquid comprising water and blood, substantially as described.

3. A composition of matter composed of a mixture of approximately 8 parts by weight of cement, 3 parts by weight of charcoal, to which is added before setting 1½ parts by weight of blood, and 1 part by weight of water, substantially as described.

Signed at Seattle, Washington this 29th day of June 1911.

CONRAD O. STINEBAUGH.

Witnesses:
STEPHEN A. BROOKS,
J. L. ADAMS.

Copies of this patent may be obtained for five cents each, by addressing the "Commissioner of Patents, Washington, D. C."